(12) United States Patent
Xu et al.

(10) Patent No.: US 12,551,187 B2
(45) Date of Patent: Feb. 17, 2026

(54) SYSTEMS AND METHODS OF PROVIDING USER GUIDANCE FOR ACQUIRING HEPATO-RENAL INDEX MEASUREMENTS

(71) Applicant: KONINKLIJKE PHILIPS N.V., Eindhoven (NL)

(72) Inventors: Jingping Xu, Shanghai (CN); Jiayin Zhou, Shanghai (CN); Ling Tong, Suzhou (CN); Junping Deng, Shanghai (CN); William Tao Shi, Wakefield, MA (US); Hua Xie, Cambridge, MA (US)

( * ) Notice: Subject to any disclaimer, the term of this patent is extended or adjusted under 35 U.S.C. 154(b) by 151 days.

(21) Appl. No.: 18/285,512

(22) PCT Filed: Apr. 2, 2022

(86) PCT No.: PCT/EP2022/058822
§ 371 (c)(1),
(2) Date: Oct. 4, 2023

(87) PCT Pub. No.: WO2022/214410
PCT Pub. Date: Oct. 13, 2022

(65) Prior Publication Data
US 2024/0180519 A1  Jun. 6, 2024

(30) Foreign Application Priority Data
Apr. 6, 2021  (CN) .......................... 202110366791.X

(51) Int. Cl.
*A61B 8/00* (2006.01)
*A61B 8/08* (2006.01)
(Continued)

(52) U.S. Cl.
CPC ................. *A61B 8/42* (2013.01); *A61B 8/08* (2013.01); *A61B 8/463* (2013.01); *A61B 8/469* (2013.01);
(Continued)

(58) Field of Classification Search
CPC .. A61B 8/42; A61B 8/08; A61B 8/463; A61B 8/469; A61B 8/085; A61B 8/5223;
(Continued)

(56) References Cited

U.S. PATENT DOCUMENTS 6,443,896 B1  9/2002  Detmer
6,530,885 B1  3/2003  Entrekin et al.
(Continued)

FOREIGN PATENT DOCUMENTS

WO  2016141449 A1  9/2016
WO  2020020809 A1  1/2020

OTHER PUBLICATIONS

International Search Report and Written Opinion for PCT/EP2022/058822; Mailing date: Aug. 23, 2022, 10 pages.
(Continued)

*Primary Examiner* — Amal Aly Farag

(57) ABSTRACT

Guidance may be provided to users, at least in part, by graphic overlays on displays of ultrasound images. The guidance may assist users in acquiring images suitable for making hepato-renal index (HRI) measurements. In some examples, the guidance may assist the user in finding the proper imaging plane including a portion of the liver and kidney. In some examples, the guidance may further assist the user in proper placement of regions of interest within the image for calculating the HRI, such as at the same depth and appropriate portions of the liver and kidney. In some examples, one or more processors may analyze the image to ensure the quality is suitable for calculating the HRI.

20 Claims, 11 Drawing Sheets

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2200/24* (2013.01); *G06T 2207/20021* (2013.01); *G06T 2207/20104* (2013.01); *G06T 2207/30056* (2013.01); *G06T 2207/30084* (2013.01); *G06T 2207/30168* (2013.01)

(58) Field of Classification Search
CPC ..... G06T 7/0012; G06T 7/11; G06T 2200/24; G06T 2207/20021; G06T 2207/20104; G06T 2207/30056; G06T 2207/30084; G06T 2207/30168; G06T 2207/10132; G06T 2207/20096; G06T 11/203; G06T 7/60

See application file for complete search history.

(56) References Cited

U.S. PATENT DOCUMENTS

| | | | |
|---|---|---|---|
| 2016/0328855 A1* | 11/2016 | Lay | G06T 7/11 |
| 2017/0273667 A1 | 9/2017 | Labyed | |
| 2020/0305837 A1* | 10/2020 | Aladahalli | A61B 8/469 |
| 2021/0177373 A1 | 6/2021 | Xie et al. | |

OTHER PUBLICATIONS

Cha, D. et al., "Deep learning-based automated quantification of the hepatorenal index for evaluation of fatty liver by ultrasonography", Ultrasonography, 2021, vol. 40, Issue 4, pp. 565-574.

Kim, K.B. et al., "Automatic segmentation of liver/kidney area with double-layered fuzzy C-means and the utility of hepatorenal index for fatty liver severity classification", Journal of Intelligent & Fuzzy Systems, 2020, vol. 39, No. 1, pp. 925-936.

Pirmoazen, A. et al., "Quantitative ultrasound approaches for diagnosis and monitoring hepatic steatosis in nonalcoholic fatty liver disease", Theranostics, 2020, vol. 10, No. 9, pp. 4277-4289.

Avramovski, P. et al., "The predictive value of the hepatorenal index for detection of impaired glucose metabolism in patients with non-alcoholic fatty liver disease", Indian J Gastroenterology, 2020, vol. 39, No. 1, pp. 50-59.

Jesper, D. et al., "Ultrasound-Based Attenuation Imaging for the Non-Invasive Quantification of Liver Fat—A Pilot Study on Feasibility and Inter-Observer Variability", Medical Imaging and Diagnostic Radiology, 2020, vol. 8, 9 pages.

Han, A. et al., "Noninvasive Diagnosis of Nonalcoholic Fatty Liver Disease and Quantification of Liver Fat with Radiofrequency Ultrasound Data Using One-dimensional Convolutional Neural Networks", Radiology, 2020, vol. 295, pp. 342-350.

Marshall, R. et al., "Hepatorenal Index as an Accurate, Simple, and Effective Tool in Screening for Steatosis", AJR Am J Roentgenol, 2012, vol. 199, Issue 5, pp. 997-100.

Chauhan, A. et al., "Diagnostic Accuracy of Hepatorenal Index in the Detection and Grading of Hepatic Steatosis", J Clin Ultrasound, 2016, vol. 44, Issue 9, pp. 580-586.

Hong, C. et al., "Reader agreement and accuracy of ultrasound features for hepatic steatosis", Abdom Radiol, 2019, vol. 44, pp. 54-64.

* cited by examiner

SYSTEMS AND METHODS OF PROVIDING USER GUIDANCE FOR ACQUIRING HEPATO-RENAL INDEX MEASUREMENTS

CROSS-REFERENCE TO PRIOR APPLICATIONS

This application is the U.S. National Phase application under 35 U.S.C. § 371 of International Application No. PCT/EP2022/058822, filed on Apr. 2, 2022, which claims the benefit of Chinese Patent Application No. 202110366791.X, filed on Apr. 6, 2021. These applications are hereby incorporated by reference herein.

TECHNICAL FIELD

This application relates to providing user guidance for acquiring hepato-renal index measurements. More specifically, this application relates to providing guidance for selecting imaging planes and regions of interest for calculating the hepato-renal index.

BACKGROUND

Non-alcoholic Fatty Liver Disease (NAFLD) has become one of the major causes of liver disease due to high prevalence of obesity and diabetes. Its incidence rate has been steadily increasing affecting about 25%-30% population in western and developing countries. The clinical term for fatty liver is hepatic steatosis, defined as excessive accumulation of fat (above 5%-10% by weight) in liver cells as triglycerides. Early stage of liver steatosis is silent and reversible by simple life style change, for instance through regular exercise and healthy dieting. Liver steatosis can turn into more advanced liver disease such as non-alcoholic steatohepatitis (NASH) and liver fibrosis. If left untreated at these stages, fatty liver will progress to end-stage disease including cirrhosis and primary cancer hepatocellular carcinoma.

In current clinical practice, the gold standard of fatty liver diagnosis is liver biopsy, an invasive procedure subject to sampling error and interpretation variability. Magnetic resonance proton density fat fraction (MR-PDFF) is considered the new reference standard for NAFLD diagnosis as it can provide a quantitative biomarker of liver fat content. However MR-PDFF is an expensive diagnostic tool which may not always be available, particularly at small hospitals. Compared to magnetic resonance imaging (MRI), ultrasound is a widely available and cost-effective imaging modality. Thus, ultrasound may be more suitable for screening and/or diagnosis of the general population with low risk.

Hepato-renal index (HRI), an ultrasound based method, has been used clinically for fatty liver detection. Excessive fat infiltration in liver increases acoustic backscattering coefficient leading to higher grayscale values in ultrasound B-mode imaging. At a normal state, liver parenchyma and renal cortex (RC) of the kidney have similar echogenicity. With more fat deposit, liver will appear more hyperechoic (i.e. brighter) than the RC. HRI is often calculated as the echo-intensity ratio of liver to RC. Based on the B-mode data echo intensities from the liver and kidney are estimated by selecting regions of interest (ROIs) within the liver parenchyma and the RC at a similar depth and then averaging grayscale echo-intensity values in the ROIs. However, there are reliability issues with HRI that limit its application, some due to user errors. For example, users may not acquire an image from an image plane that includes sufficient tissue in both the liver and the kidney or may select an ROI in the kidney that is at a different depth than the ROI in the liver. Accordingly, improved techniques for acquiring the HRI that are less prone to user errors are desired.

SUMMARY

Systems, apparatuses, and methods for guiding a user to acquire an image at a suitable image plane and to select ROIs in a liver and a kidney at a same depth are disclosed. In some examples, the image and/or selected ROIs may be analyzed to confirm sufficient quality for calculating HRI. If the selected ROIs are not of sufficient quality, the user may be prompted to select new ROIs and/or acquire a new image.

In accordance with at least one example disclosed herein, an ultrasound imaging system may be configured to provide user guidance for acquiring images suitable for hepato-renal index measurements and may include a non-transitory computer readable medium encoded with instructions, and at least one processor in communication with the non-transitory computer readable medium and configured to execute the instructions, wherein when executed, the instructions cause the at least one processor to segment a liver region, a kidney region, and a hepatorenal interface from an image, fit a curve to the hepatorenal interface, calculate an anchor point at a midpoint of the curve, determine a tangent line to the curve at the anchor point, determine a horizontal line at the midpoint, calculate an angle between the tangent line and the horizontal line, and generate a visual cue for display, wherein the visual cue is based, at least in part, on the tangent line and the angle between the tangent line and the horizontal line, The imaging system may include a display configured to display the image and the visual cue as a graphical overlay over the image.

In accordance with at least one example disclosed herein, a method for providing user guidance for acquiring images suitable for hepato-renal index measurements may include receiving an image, segmenting a liver region, a kidney region, and a hepatorenal interface from the image, fitting a curve to the hepatorenal interface, calculating an anchor point at a midpoint of the curve, determining a tangent line to the curve at the anchor point, determining a horizontal line at the midpoint, calculating an angle between the tangent line and the horizontal line, displaying the image, and displaying a visual cue as a graphical overlay over the image, wherein the visual cue is based, at least in part the tangent line and the angle between the tangent line and the horizontal line.

DESCRIPTION

Figure 1:
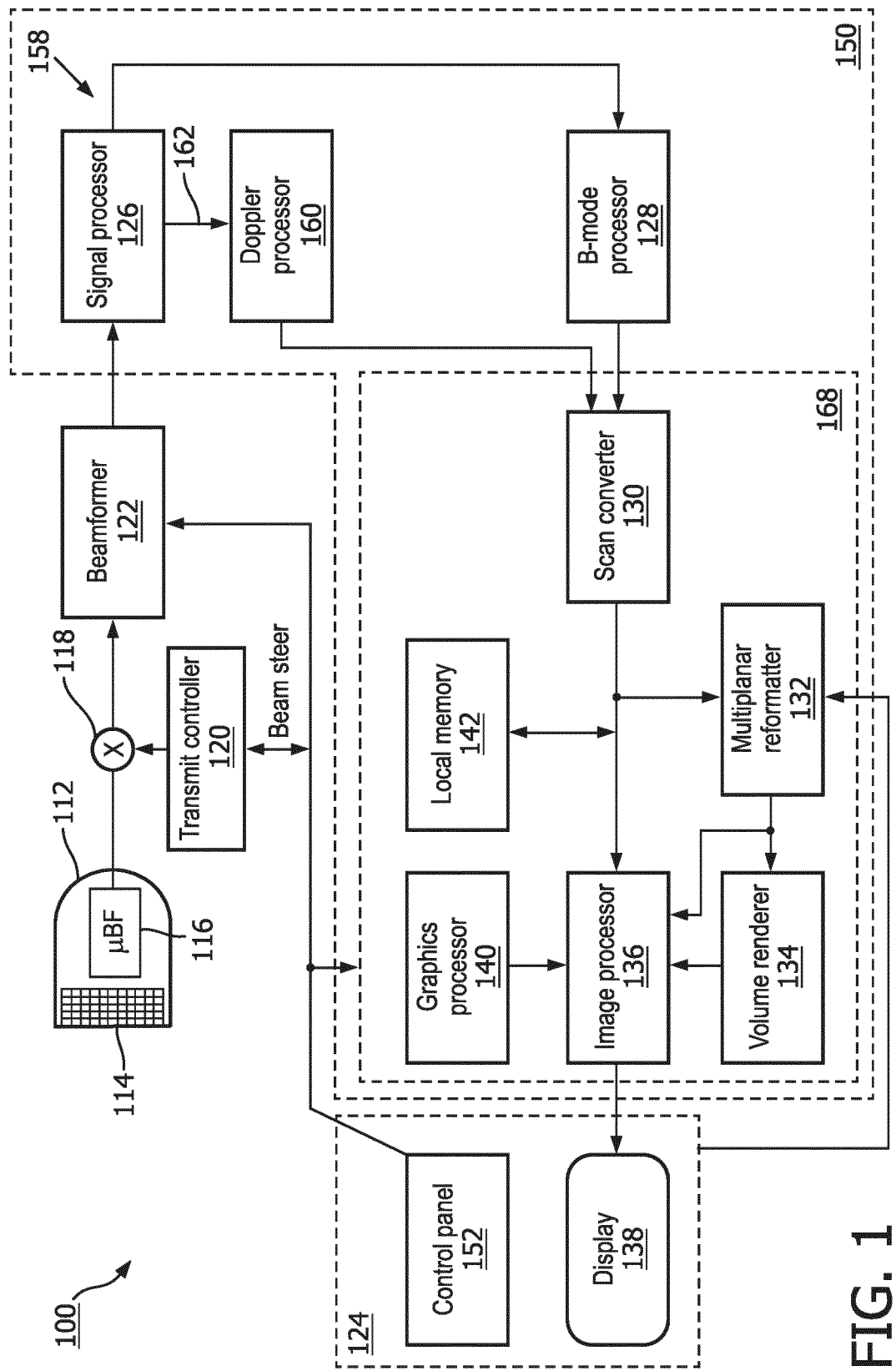
FIG. 1 is a block diagram of an ultrasound imaging system arranged according to principles of the present disclosure.

The following description of certain exemplary examples is merely exemplary in nature and is in no way intended to limit the disclosure or its applications or uses. In the following detailed description of examples of the present systems and methods, reference is made to the accompanying drawings which form a part hereof, and in which are shown by way of illustration specific examples in which the described systems and methods may be practiced. These examples are described in sufficient detail to enable those skilled in the art to practice the presently disclosed systems and methods, and it is to be understood that other examples may be utilized and that structural and logical changes may be made without departing from the spirit and scope of the present disclosure. Moreover, for the purpose of clarity, detailed descriptions of certain features will not be discussed when they would be apparent to those with skill in the art so as not to obscure the description of the present disclosure. The following detailed description is therefore not to be taken in a limiting sense, and the scope of the present systems and methods is defined only by the appended claims.

The hepato-renal index (HRI) is typically acquired based on the pixel intensities of the B-mode image displayed on an ultrasound imaging system. HRI can be a useful diagnostic indicator for fatty liver disease when it is measured properly. The reliability of HRI may suffer from poor image acquisition and/or improper selection of regions of interest (ROIs) on the liver and/or kidney.

During a liver imaging exam where an HRI measurement is desired, the liver and kidney should be imaged at an imaging plane that provides an adequate portion of the liver on one side of the image (typically on the left side of the image on current systems) and an adequate portion of the kidney on the other side of the image (typically on the right side of the image on current systems) for selection of ROIs in each organ. Furthermore, the image plane should be such that there is an adequate portion of both liver and kidney at similar imaging depths (preferably the same imaging depth). That is, the liver and kidney should appear roughly side-by-side rather than appearing stacked vertically in relation to the imaging beam. However, practically, there is a limited view of the liver and kidney due to the ribs. Typically, two-dimensional (2D) ultrasound images are obtained at particular scanning angles at particular anatomical locations. For example, an image of the hepatorenal interface at the 'Morrison' pouch may be obtained. Once the hepatorenal interface image is obtained, the probe may be rotated slightly to obtain the desired image of the liver and kidney approximately side-by-side for HRI measurement.

If the interface between the liver and kidney (the hepatorenal interface) is horizontal or near horizontal in the image (e.g., perpendicular or near perpendicular to the direction of the beam), the effective depth information of the kidney in the ultrasound image may be lacking, and may not be a reliable reference for HRI computation. A higher angle with respect to a horizontal line (e.g., a line perpendicular to the direction of the beam) at the interface between the liver and kidney may provide better effective depth information for the kidney. However, due to the ribs and other anatomy limiting the field of view of the ultrasound probe, in practice, the angle at the interface of the liver and kidney may be limited in range, for example, zero degrees to a few tens of degrees (e.g., 40 degrees, 50 degrees) during examination.

Given the anatomical realities imposing physical limits on ultrasound probe placement and orientation, acquiring a suitable image for HRI computations may require a significant amount of time and/or a skilled sonographer. Furthermore, once an image is acquired, determining appropriate ROIs in the image to use for the HRI may also require significant time and skill. Accordingly, techniques for assisting ultrasound users to acquire suitable images and appropriate ROIs is desirable.

The present disclosure is directed to systems and methods for guiding a user to select an acceptable imaging plane by providing visual cues as graphical overlays on an image on a display of an ultrasound imaging system during scanning. For example, the visual cue may include an indication of an angle of a line tangent to the hepatorenal interface. Once an image is acquired, statistical properties of an acquired image at different depth bands may be evaluated to confirm the acquired image is suitable for computing HRI measurements. In some examples, a graphical indication of the depth bands may be provided on the display to assist the user in selecting two ROIs at a same depth in the liver and kidney. In some applications, the reliability and reproducibility of HRI measurements may be improved. In some applications, the workflow for acquiring HRI measurements may be improved. In some applications, the time and/or skill required for the user to obtain HRI measurements may be reduced.

FIG. 1 shows a block diagram of an ultrasound imaging system 100 constructed in accordance with the principles of the present disclosure. An ultrasound imaging system 100 according to the present disclosure may include a transducer array 114, which may be included in an ultrasound probe 112, for example an external probe or an internal probe. The transducer array 114 is configured to transmit ultrasound signals (e.g., beams, waves) and receive echoes responsive to the ultrasound signals. A variety of transducer arrays may be used, e.g., linear arrays, curved arrays, or phased arrays. The transducer array 114, for example, can include a two dimensional array (as shown) of transducer elements capable of scanning in both elevation and azimuth dimensions for 2D and/or 3D imaging. As is generally known, the axial direction is the direction normal to the face of the array (in the case of a curved array the axial directions fan out), the azimuthal direction is defined generally by the longitudinal dimension of the array, and the elevation direction is transverse to the azimuthal direction.

In some embodiments, the transducer array 114 may be coupled to a microbeamformer 116, which may be located in the ultrasound probe 112, and which may control the transmission and reception of signals by the transducer elements in the array 114. In some embodiments, the microbeamformer 116 may control the transmission and reception of signals by active elements in the array 114 (e.g., an active subset of elements of the array that define the active aperture at any given time).

In some embodiments, the microbeamformer 116 may be coupled, e.g., by a probe cable or wirelessly, to a transmit/receive (T/R) switch 118, which switches between transmission and reception and protects the main beamformer 222 from high energy transmit signals. In some embodiments, for example in portable ultrasound systems, the T/R switch 118 and other elements in the system can be included in the ultrasound probe 112 rather than in the ultrasound system base, which may house the image processing electronics. An ultrasound system base typically includes software and hardware components including circuitry for signal processing and image data generation as well as executable instructions for providing a user interface (e.g., processing circuitry 150 and user interface 124).

The transmission of ultrasonic signals from the transducer array 114 under control of the microbeamformer 116 is directed by the transmit controller 120, which may be coupled to the T/R switch 118 and a main beamformer 122. The transmit controller 120 may control the direction in which beams are steered. Beams may be steered straight ahead from (orthogonal to) the transducer array 114, or at different angles for a wider field of view. The transmit controller 120 may also be coupled to a user interface 124 and receive input from the user's operation of a user control. The user interface 124 may include one or more input devices such as a control panel 152, which may include one or more mechanical controls (e.g., buttons, encoders, etc.), touch sensitive controls (e.g., a trackpad, a touchscreen, or the like), and/or other known input devices.

In some embodiments, the partially beamformed signals produced by the microbeamformer 116 may be coupled to a main beamformer 122 where partially beamformed signals from individual patches of transducer elements may be combined into a fully beamformed signal. In some embodiments, microbeamformer 116 is omitted, and the transducer array 114 is under the control of the main beamformer 122 which performs all beamforming of signals. In embodiments with and without the microbeamformer 116, the beamformed signals of the main beamformer 122 are coupled to processing circuitry 150, which may include one or more processors (e.g., a signal processor 126, a B-mode processor 128, a Doppler processor 160, and one or more image generation and processing components 168) configured to produce an ultrasound image from the beamformed signals (e.g., beamformed RF data).

The signal processor 126 may be configured to process the received beamformed RF data in various ways, such as bandpass filtering, decimation, I and Q component separation, and harmonic signal separation. The signal processor 126 may also perform additional signal enhancement such as speckle reduction, signal compounding, and noise elimination. The processed signals (also referred to as I and Q components or IQ signals) may be coupled to additional downstream signal processing circuits for image generation. The IQ signals may be coupled to a plurality of signal paths within the system, each of which may be associated with a specific arrangement of signal processing components suitable for generating different types of image data (e.g., B-mode image data, Doppler image data). For example, the system may include a B-mode signal path 158 which couples the signals from the signal processor 126 to a B-mode processor 128 for producing B-mode image data.

The B-mode processor can employ amplitude detection for the imaging of structures in the body. The signals produced by the B-mode processor 128 may be coupled to a scan converter 130 and/or a multiplanar reformatter 132. The scan converter 130 may be configured to arrange the echo signals from the spatial relationship in which they were received to a desired image format. For instance, the scan converter 130 may arrange the echo signal into a two dimensional (2D) sector-shaped format, or a pyramidal or otherwise shaped three dimensional (3D) format. The multiplanar reformatter 132 can convert echoes which are received from points in a common plane in a volumetric region of the body into an ultrasonic image (e.g., a B-mode image) of that plane, for example as described in U.S. Pat. No. 6,443,896 (Detmer). The scan converter 130 and multiplanar reformatter 132 may be implemented as one or more processors in some embodiments.

A volume renderer 134 may generate an image (also referred to as a projection, render, or rendering) of the 3D dataset as viewed from a given reference point, e.g., as described in U.S. Pat. No. 6,530,885 (Entrekin et al.). The volume renderer 134 may be implemented as one or more processors in some embodiments. The volume renderer 134 may generate a render, such as a positive render or a negative render, by any known or future known technique such as surface rendering and maximum intensity rendering.

In some embodiments, the system may include a Doppler signal path 162 which couples the output from the signal processor 126 to a Doppler processor 160. The Doppler processor 160 may be configured to estimate the Doppler shift and generate Doppler image data. The Doppler image data may include color data which is then overlaid with B-mode (i.e. grayscale) image data for display. The Doppler processor 160 may be configured to filter out unwanted signals (i.e., noise or clutter associated with non-moving tissue), for example using a wall filter. The Doppler processor 160 may be further configured to estimate velocity and power in accordance with known techniques. For example, the Doppler processor may include a Doppler estimator such as an auto-correlator, in which velocity (Doppler frequency, spectral Doppler) estimation is based on the argument of the lag-one autocorrelation function and Doppler power estimation is based on the magnitude of the lag-zero autocorrelation function. Motion can also be estimated by known phase-domain (for example, parametric frequency estimators such as MUSIC, ESPRIT, etc.) or time-domain (for example, cross-correlation) signal processing techniques. The velocity and/or power estimates may then be mapped to a desired range of display colors in accordance with a color map. The color data, also referred to as Doppler image data, may then be coupled to the scan converter 130, where the Doppler image data may be converted to the desired image format and overlaid on the B-mode image of the tissue structure to form a color Doppler or a power Doppler image.

Outputs from the scan converter 130, the multiplanar reformatter 132, and/or the volume renderer 134 may be coupled to an image processor 136 for further enhancement, buffering and temporary storage before being displayed on an image display 138. A graphics processor 140 may generate graphic overlays for display with the images. These graphic overlays can contain, e.g., standard identifying information such as patient name, date and time of the image, imaging parameters, and the like. For these purposes the graphics processor 140 may be configured to receive input from the user interface 124, such as a typed patient name or other annotations. The user interface 124 can also be coupled to the multiplanar reformatter 132 for selection and control of a display of multiple multiplanar reformatted (MPR) images.

The system 100 may include local memory 142. Local memory 142 may be implemented as any suitable non-transitory computer readable medium (e.g., flash drive, disk drive). Local memory 142 may store data generated by the system 100 including ultrasound images, executable instructions, patient medical history, or any other information necessary for the operation of the system 100. In some examples, local memory 1242 may include multiple memories, which may be the same or of different type. For example, local memory 142 may include a dynamic random access memory (DRAM) and a flash memory.

As mentioned previously system 100 includes user interface 124. User interface 124 may include display 138 and control panel 152. The display 138 may include a display device implemented using a variety of known display technologies, such as LCD, LED, OLED, or plasma display technology. In some embodiments, display 138 may comprise multiple displays. The control panel 152 may be configured to receive user inputs (e.g., exam type, store an image frame, freeze a window, ROI selection). The control panel 152 may include one or more hard controls (e.g., buttons, knobs, dials, encoders, mouse, trackball or others). In some embodiments, the control panel 152 may additionally or alternatively include soft controls (e.g., GUI control elements or simply, GUI controls) provided on a touch sensitive display. In some embodiments, display 138 may be a touch sensitive display that includes one or more soft controls of the control panel 152.

The components of system 100 shown in FIG. 1 may not comprise all of the components of system 100. For example, system 100 may include one or more processors for implementing an operating system for the system, which may provide the GUI elements described herein. In another example, system 100 may include various interfaces for receiving or transmitting information wirelessly or via wired connections, such as transmitting acquired images to a picture archiving and communication system (PACS) and receiving electronic medical records from a hospital server.

In some embodiments, various components shown in FIG. 1 may be combined. For instance, the multiplanar reformatter 132 and volume renderer 134 may be implemented as a single processor. In some embodiments, various components shown in FIG. 1 may be implemented as separate components. For example, signal processor 126 may be implemented as separate signal processors for each imaging mode (e.g., B-mode, Doppler). In another example, the image processor 136 may be implemented as separate processors for different tasks and/or parallel processing of a same task. In some embodiments, one or more of the various processors shown in FIG. 1 may be implemented by general purpose processors and/or microprocessors configured to perform the specified tasks. In some examples, the processors may be configured by providing instructions for the tasks from a non-transitory computer readable medium (e.g., from local memory 142). The instructions may then be executed by the processors. In some embodiments, one or more of the various processors may be implemented as application specific circuits. In some embodiments, one or more of the various processors (e.g., image processor 136) may be implemented with one or more graphical processing units (GPU).

In some examples, a user may provide a user input via the user interface 124 when HRI measurements are desired from a subject. For example, the user may select an HRI option from a menu of an operating system of the system 100. Optionally, the system 100 may import the subject's medical records (e.g., from the hospital information system (HIS)) and confirm the subject does not have chronic renal disease or coexisting chronic renal and liver disease that may make the subject unsuitable for HRI measurements. Alternatively, the system 100 may prompt the user to check the subject's medical records to confirm the subject is suitable for HRI measurements. If the subject is not suitable for HRI measurements, the subject may be referred to a different technique for assessing NAFLD. Other techniques may include different ultrasound techniques (e.g., machine learning-based analysis) and/or other imaging modalities (e.g., MRI).

The imaging system 100 may provide guidance to the user to acquire an appropriate imaging plane for obtaining HRI measurements. The user may acquire an initial image of the liver and kidney (or portions thereof). The imaging system 100 may determine a location of the hepatorenal interface (e.g., the interface) from the initial image, and based, at least in part, on the curve of the hepatorenal interface, the system 100 may provide guidance to the user for obtaining a suitable imaging plane for acquiring HRI measurements. In some examples, the location may be determined by one or more processors, such as image processor 136 of system 100. The guidance may include one or more visual cues that indicate geometries of anatomical features and/or positions of anatomical features relative to one another, the image frame (e.g., field of view of the ultrasound probe 112), and/or ultrasound beam (e.g., beam provided by transducer array 114). The visual cues may allow a user to visually determine when suitable portions of the liver and kidney are present in the image and/or when the liver and kidney are at suitable positions relative to one another in the image. Examples of visual cues include, but are not limited to, an anchor point indicating a midpoint of the hepatorenal interface, a line tangent to the hepatorenal interface at the midpoint, a horizontal line through the midpoint, and/or a bounding box around a central portion of the image. In some examples, the visual cues may be provided as graphical overlays over the image. In some examples, the graphical overlay may be generated by one or more processors, such as image processor 136 and/or graphics processor 140.

Figure 2:
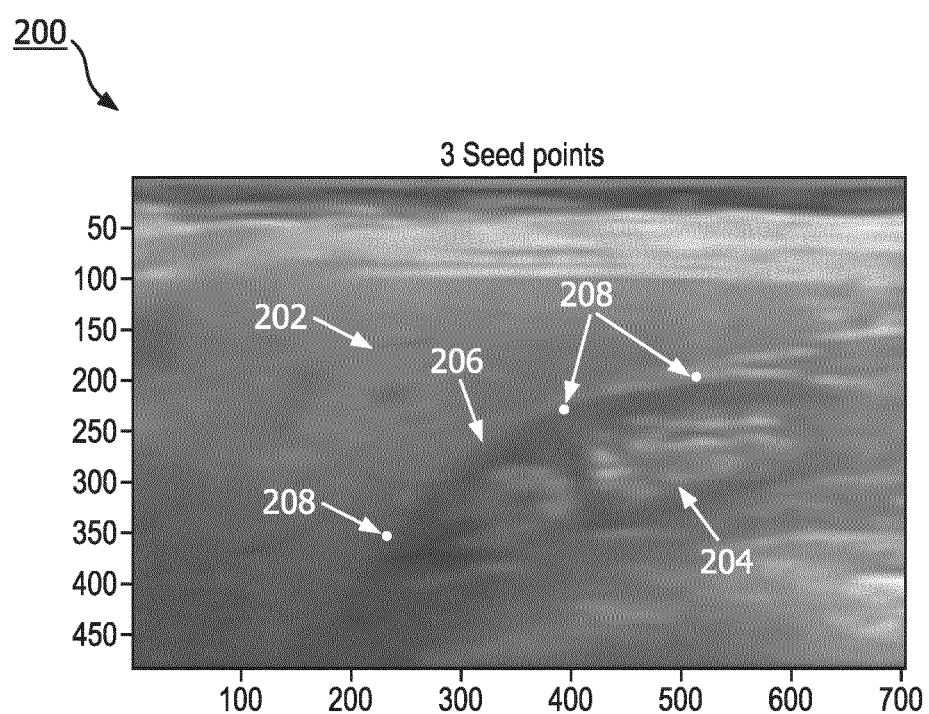
FIG. 2 shows an example image including a portion of a liver and a kidney according to principles of the present disclosure.

FIG. 2 shows an example image including a portion of a liver and a kidney according to principles of the present disclosure. Image 200 is an ultrasound image including a portion of a liver 202 and a portion of a kidney 204. In some examples, the imaging system 100 may determine a location of the interface 206 between the liver 202 and kidney 204 automatically based on image segmentation techniques (e.g., edge detection, machine learning). Alternatively, the location of the interface 206 may be found by semi-automatic techniques. For example, the user may provide inputs via the user interface 124 to indicate one or more seed points 208 along the interface 206. In some examples, such as the one shown in FIG. 2, the user may provide 2-4 seed points 208. The imaging system 100 may determine the location of the interface 206 based, at least in part, on the seed points 208 using image segmentation and/or deep learning techniques. In some examples, in addition to determining a location of the interface 206, the imaging system 100 may segment the liver 202 and/or kidney 204 from the image 200. In some examples, one or more processors of the imaging system 100, such as image processor 136, may determine the location of the interface 206 and/or segment the liver 202 and kidney 204 from the image.

Figure 3:
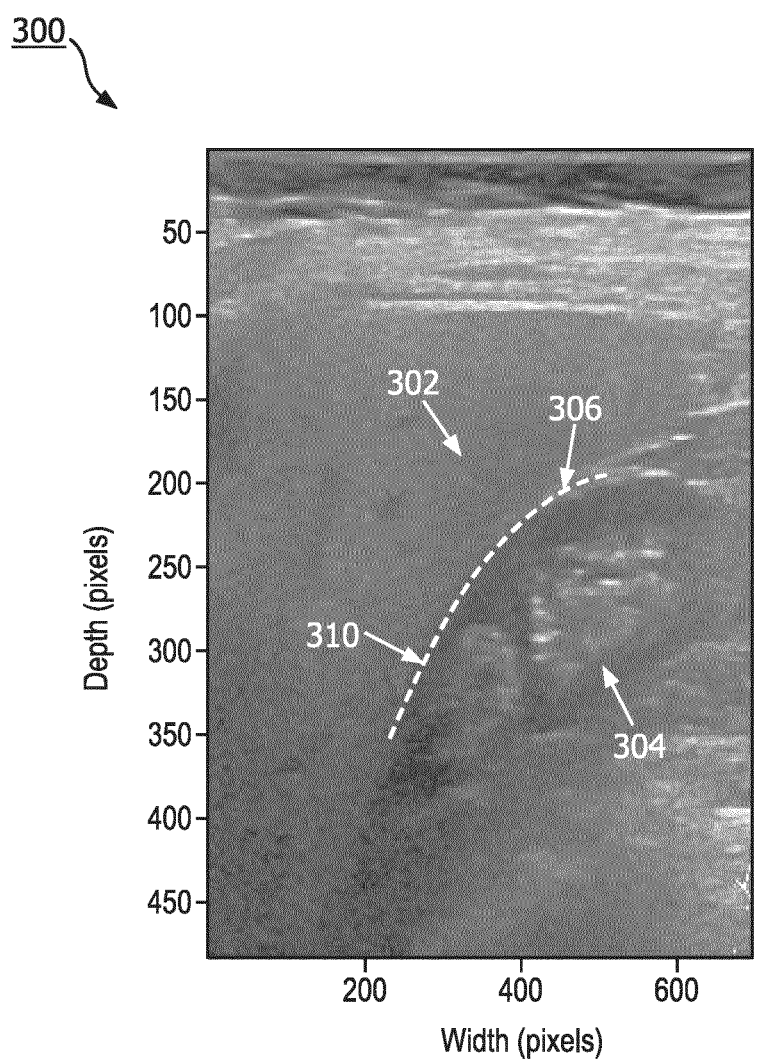
FIG. 3 shows an example image including a portion of a liver and a kidney with a curve fitted to the interface according to principles of the present disclosure.

In some examples, a curve may be fitted to the interface by the one or more processors. FIG. 3 shows an example image including a portion of a liver and a kidney with a curve fitted to the interface according to principles of the present disclosure. Image 300 is an ultrasound image including a portion of a liver 302 and a portion of a kidney 304. At least a portion of the hepatorenal interface 306 is also visible in image 300. A processor, such as image processor 136 may calculate an equation that defines a curve 310 fitted to the interface 306. The curve 310 may be based at least in part, on automatic or semi-automatic segmentation techniques, for example, as described with reference to FIG. 2, used to determine the location of the interface 306. In some examples, nonlinear curve fitting techniques may be used to define the curve 310. While the curve 310 may be provided on display 138 as an overlay on the image 300, in other examples, the equation defining curve 310 may be calculated and stored in system 100, but curve 310 need not be displayed.

Based, at least in part, on the curve of the hepatorenal interface, the system 100 may provide guidance to the user for obtaining a suitable imaging plane for acquiring HRI measurements. For example, the system 100 may provide one or more visual cues on display 138. The visual cues may include one or more graphical overlays generated based, at least in part, on the curve of the hepatorenal interface.

Figure 4A:
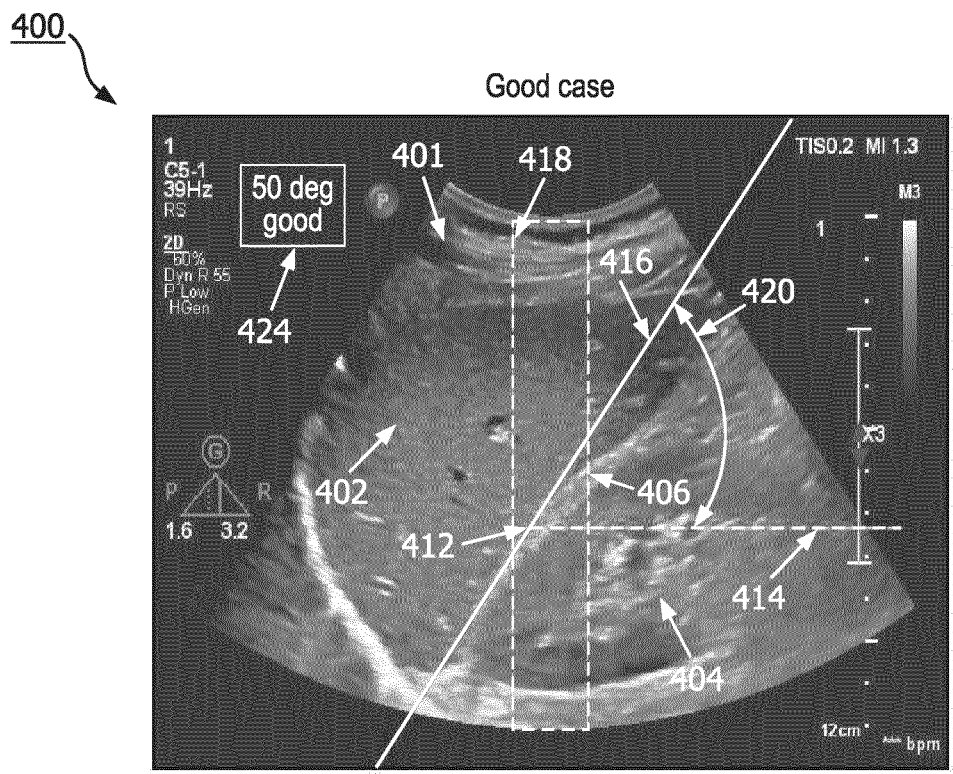
FIG. 4A and FIG. 4B show example images on a display with graphical overlays to provide guidance to a user according to principles of the present disclosure.
Figure 4B:
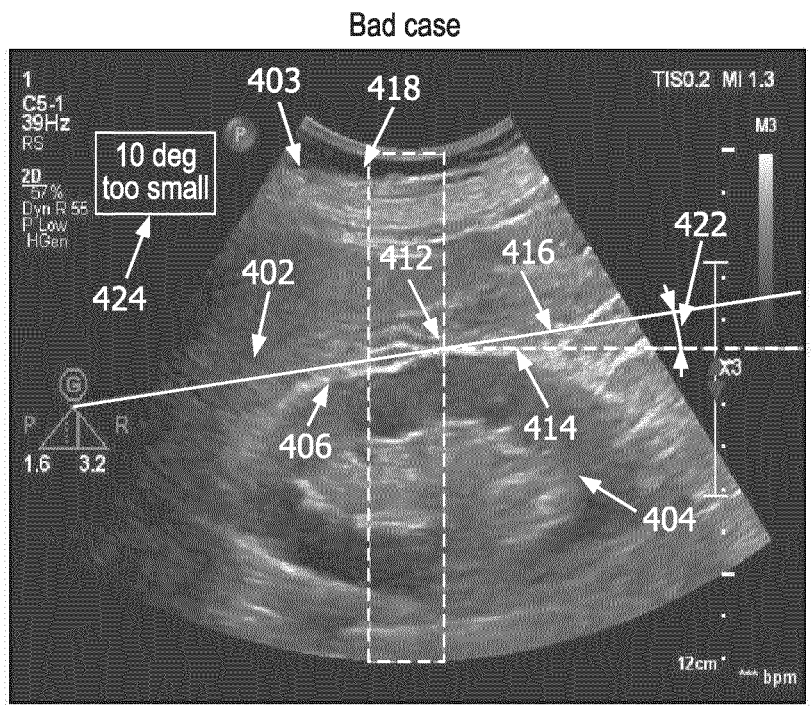

FIG. 4A and FIG. 4B show example images on a display with graphical overlays to provide guidance to a user according to principles of the present disclosure. Display 400 may be included in display 138 in some examples. The display may provide an ultrasound image, such as image 401 in FIG. 4A and image 403 in FIG. 4B. Both image 401 and 403 include a portion of a liver 402, a kidney 404, and a hepatorenal interface 406, which is the lighter grayscale region (e.g., the generally whiter line) between the liver 402 and kidney 404. The display 400 may further provide visual cues as graphical overlays based, in part, on the geometry of the interface 406 for guiding the user to acquire an image suitable for obtaining HRI measurements. In some examples, the graphical overlays may include an anchor point 412, a horizontal line 414, a tangent line 416, bounding box 418, and/or angle indicator 424. Although not shown in FIGS. 4A and 4B, in some examples, the graphical overlays may further include a curve fitted to the hepatorenal interface 406, such as curve 310 shown in FIG. 3.

The images 401 and 403 may be segmented and a curve fitted to the hepatorenal interface 406 (even if the curve is not displayed) as described with reference to FIGS. 2 and 3. A midpoint of the curve fitted to the hepatorenal interface 406 may be calculated and indicated by anchor point 412. A horizontal line (e.g., a line perpendicular to a center scan line of an ultrasound beam emitted by a transducer array, such as transducer array 114) extending through the anchor point 412 may be calculated and provided as horizontal line 414. However, in some examples, horizontal line 414 may not be shown on the display. A line tangent to the curve fitted to the hepatorenal interface 406 at the anchor point 412 may be calculated and provided as tangent line 416. Optionally, in some examples, only the tangent line 416 is displayed, and the anchor point 412 is not provided on the display. The segmentation, curve, anchor point 412, horizontal line 414, and/or tangent line 416 may be calculated by one or more processors, such as image processor 136. In some example, display information based on the calculations may be generated by another processor, such as graphics processor 140.

The angle between the tangent line 416 and horizontal line 414 (even if not displayed) may be calculated by the one or more processors. A larger angle between the tangent line 416 and horizontal line 414 (e.g., a greater slope of the tangent line 416) may provide a more suitable image for HRI measurements in some applications as it may permit more liver 402 and kidney 404 tissue to be present at a same depth.

As shown in FIG. 4A, the angle 420 between the tangent line 416 and horizontal line 414 in image 401 is larger than angle 422 in image 403 in FIG. 4B. In image 401, significant portions of the liver 402 and kidney 404 appear next to each other whereas in image 403, the liver 402 is predominantly above the kidney 404. Thus, in image 403, there are little to no areas where there is liver 402 and kidney 404 tissue at a same depth for calculating HRI measurements.

By providing visual cue(s) of the angle between the tangent line 416 and the horizontal line 414 (and/or the slope of the tangent line 416), a user can more easily, with visual guidance, find an appropriate image for HRI measurements. In some examples, display 400 may display at least the tangent line 414, and in some cases also the anchor point 412 and/or the horizontal line 414, and the user may "eyeball" (or visually estimate) when a suitable angle has been achieved, e.g., by visual inspection of the incline of the tangent line relative to horizontal. In some examples, a suitable angle may be thirty degrees or greater. In some examples, the numerical value of the angle and/or slope of the tangent line 416 may be provided as text on display 400 by angle indicator 424. Additionally or alternatively, a qualitative indicator of the angle and/or slope may be provided by indicator 424. In the example shown in FIGS. 4A and 4B, text such as "Good" and "Too small" are provided. However, other qualitative indicators may be used such as different colors, different shapes, etc. The qualitative indicator may be based one or more thresholds. For example, the indicator may be "too small" or red when the angle is below thirty degrees and "good" or green when the angle is above thirty degrees. In some examples, the angle indicator 424 may be "built in" to one of the other graphic overlays. For example, tangent line 416 may change from one color to another color when a suitable angle is obtained. Visual cue(s) to guide the user may be provided in various other ways, for example by changing the color of the tangent line (e.g., from red or orange to green) when the angle between the tangent line and the horizontal is equal to or greater than the minimum threshold angle.

In addition to the suitable angle, in some examples, the user may be guided to maintain the midpoint of the hepatorenal interface 406, as may be indicated by the anchor point 412, near the center of the image 401, 403. This may help ensure that enough of the liver 402 and kidney 404 are visible for acquiring HRI measurements. In the example shown in FIGS. 4A and 4B, the bounding box 418 is displayed to guide the user for proper placement of the anchor point 412 in the image. The location of the bounding box 418 may be determined based on a midpoint of the image 401, 403. The width of the bounding box 418 may be based, at least in part, by a width of the image 401, 403. For example, the bounding box 418 may be sized to include approximately 5-20% of the scan lines/columns of pixels of the image 401, 403. In some examples, the bounding box 418 and/or anchor point 412 may change from one color to another when the anchor point 412 falls outside the bounding box 418. In some examples, the display 400 may provide a text warning that the anchor point 412 is outside the bounding box 418. Optionally, in examples where the anchor point 412 and/or bounding box 418 is not provided on the display, the tangent line 416 may change color and/or texture (e.g., solid to dashed line) when the midpoint of the hepatorenal interface 406 falls outside the central region of the image 401, 403 defined by the bounding box 418 (even if not displayed).

Once the midpoint of the hepatorenal interface 406 is in a suitable location (e.g., anchor point 412 is within the bounding box 418) and at a suitable angle (e.g., angle of 30 degrees or greater between the tangent line 416 and horizontal line 414), the imaging plane may be suitable for acquiring an image for HRI measurements. The user may save the image (e.g., image 401), for example, to local memory 142.

Although FIGS. 4A and 4B show anchor point 412, a horizontal line 414, a tangent line 416, bounding box 418, and angle indicator 424 displayed, in other examples, only some of the graphical overlays may be provided. As noted, in some examples, only the tangent line 416 may be provided. In some examples, only the angle indicator 424 may be provided. In some examples, only the tangent line 416 and angle indicator 424 may be provided. Other combinations of the visual cues may also be used. In some examples, a user may select which visual cues are provided, for example, by providing inputs via the user interface 124.

Optionally, in some embodiments, the average intensity of pixels of the hepatorenal interface 406 may be calculated by the one or more processors. If the average intensity is too high, it may indicate that the echo intensity of the kidney 404, particularly the RC of the kidney 404 may be too low for acquiring HRI measurements. In some examples, the width of the hepatorenal interface 406 may be approximately 3-5 pixels. The average intensity of a portion of the liver 402 may also be calculated. For example, a portion of the liver 402 (e.g., 20-50 pixels in width) at a same or similar depth as a portion of the hepatorenal interface 406. In some examples, multiple portions of the liver 402 at same or similar depths at multiple portions of the hepatorenal interface 406. The average intensity of the hepatorenal interface 406 (or one or more portions thereof) may be compared to the average intensity of the portion of the liver 402 (or multiple portions thereof) to determine if the imaging plane is suitable. In some examples, if the average intensity of the hepatorenal interface 406 is below a certain percentage of the average intensity of the liver 402 and/or above a certain percentage of the average intensity of the liver 402, the imaging plane may not be suitable. For example, when the average intensity of the hepatorenal interface 406 is equal to or greater than 1.5*average intensity of the liver 402, but equal to or less than 1.3*average intensity of the liver 402, the imaging plane may be suitable.

Additionally or alternatively, the average intensity of the hepatorenal interface 406 may be compared to the maximum brightness of the image 401, 403 to determine if the imaging plane is suitable. For example, if the average intensity of the hepatorenal interface 406 is greater than a certain percentage of the maximum brightness (e.g., 0.7, 0.8), then the hepatorenal interface 406 may be too bright and the kidney 404 may be too dark. In some examples, the average intensity of the hepatorenal interface 406 may be compared to both the maximum brightness of the image and the average intensity of the liver 402 to determine the suitability of the image plane.

In some examples, the display 400 may provide an indicator as to whether the average intensity of the pixels of the hepatorenal interface 406 is suitable as text in a similar manner to the angle indicator 424. In some examples where the graphical overlay includes the curve fitted to the hepatorenal interface 406, the curve may change color when the average intensity is within a suitable range.

Once an image is acquired, in some examples, the ultrasound imaging system may analyze the image to ensure the quality is suitable for acquiring HRI measurements and/or guide the user to select suitable ROIs in the image. In some examples, the ultrasound imaging system may sub-divide the acquired image into portions. One or more parameters may be extracted from each portion. In some examples, if the extracted parameter is within a certain range, the image may be determined to have a quality suitable for acquiring HRI measurements. In some examples, the parameters of adjacent portions may be compared. In some examples, if two adjacent portions have parameters of sufficiently similar values, the image may be determined to have a quality suitable for acquiring HRI measurements. If the image is found not to be of suitable quality, the ultrasound imaging system may prompt the user to acquire another image (e.g., via a text warning on display 138). The ultrasound imaging system may then return to the acquisition guidance as described with reference to FIGS. 4A and 4B.

Figure 5:
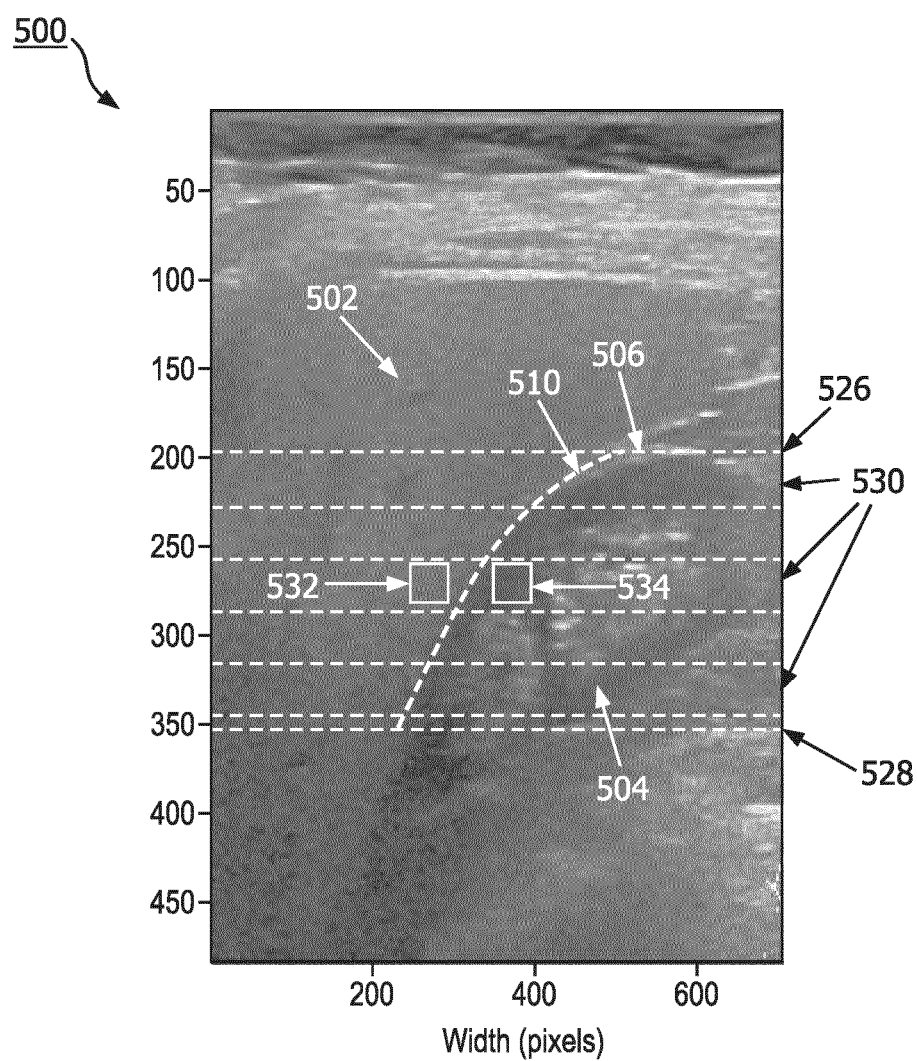
FIG. 5 shows an example image including a portion of a liver and a kidney subdivided into portions according to principles of the present disclosure.

FIG. 5 shows an example image including a portion of a liver and a kidney subdivided into portions according to principles of the present disclosure. Image 500 includes a portion of a liver 502, a portion of a kidney 504, and a portion of the hepatorenal interface 506. As described, one or more processors, such as image processor 136, may segment the image 500 and/or fit a curve 510 to the hepatorenal interface 506. Based at least in part, on the segmentation and/or curve 510, the one or more processors may determine an upper boundary 526 of the kidney 504 and a lower boundary 528 of the kidney 504. The region between the upper boundary 526 and lower boundary 528 of the kidney 504 may be divided into multiple sub-bands (e.g., depth bands) 530. In some examples, the width of the sub-bands may be approximately 1 cm-1.5 cm. One or more parameters of pixels within each sub-band may be determined (e.g., intensity distribution, average intensity, standard deviation of intensity, signal-to-noise ratio, etc.). In some examples, if the parameter of one or more of the sub-bands is within an acceptable range, the image 500 may be determined to be of suitable quality for acquiring HRI measurements. In some examples, the parameter of one sub-band may be compared to the parameter of one or more adjacent sub-bands. In some examples, if two adjacent sub-bands have parameters that are sufficiently similar (e.g., within 10%, within 20%), then the image may be determined to have a quality suitable for acquiring HRI measurements.

Figure 6:
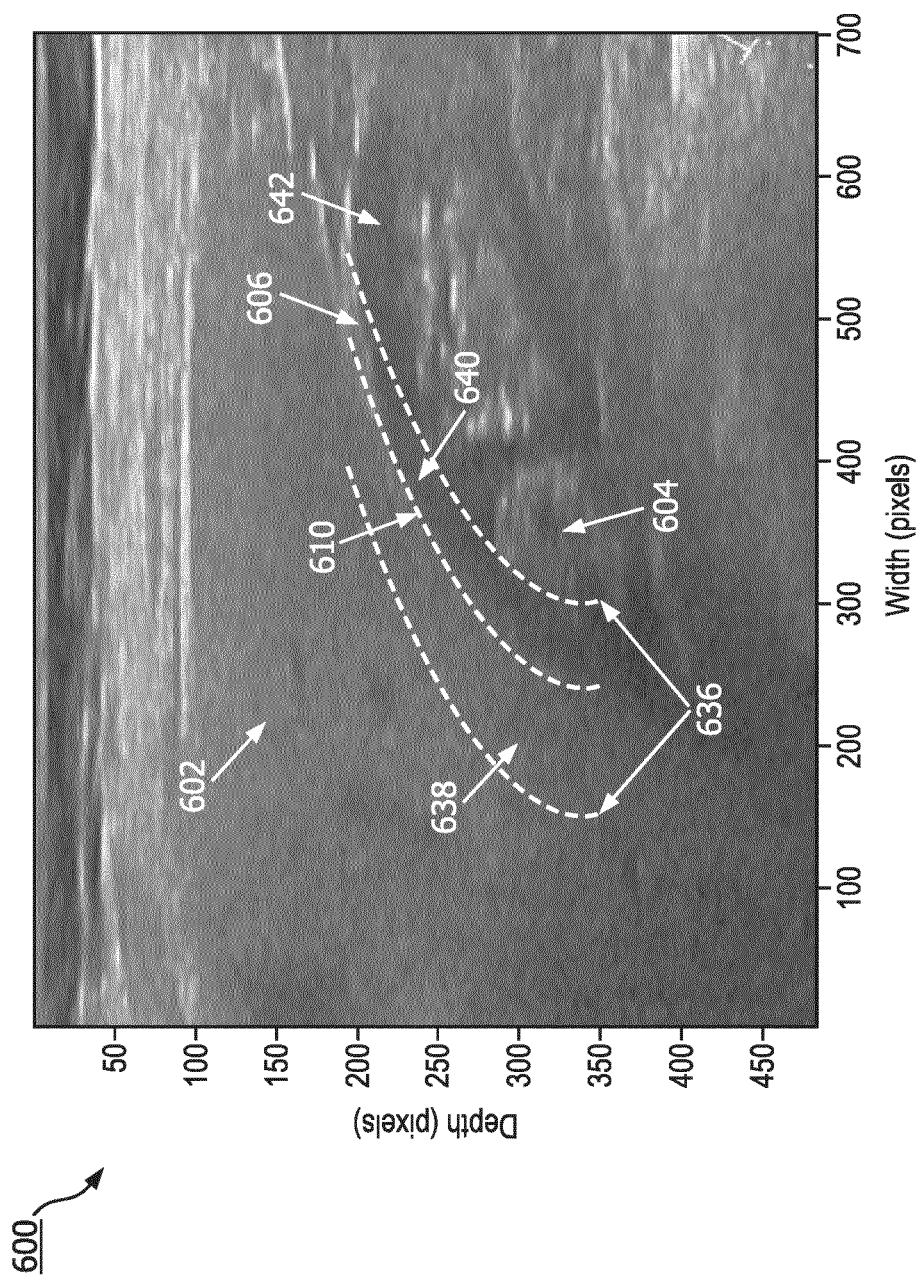
FIG. 6 shows an example image including a portion of a liver and a kidney subdivided into portions according to principles of the present disclosure.

In some examples, the ultrasound imaging system may divide the sub-bands into sub-lengths and extract parameters of the pixels from at least one sub-length from each sub-band. FIG. 6 shows an example image including a portion of a liver and a kidney subdivided into portions according to principles of the present disclosure. Image 600 includes a portion of a liver 602, a portion of a kidney 604, and a portion of the hepatorenal interface 606. As described, one or more processors, such as image processor 136, may segment the image 600 and/or fit a curve 610 to the hepatorenal interface 606. Based at least in part, on the segmentation and/or curve 610, the one or more processors may divide a portion of the image 600 from the upper bound of the kidney 604 to the lower bound of the kidney 604 into sub-lengths. Dashed lines 636 define a first sub-length 638 on a liver 602-side of the hepatorenal interface 606 and a second sub-length 640 on a kidney 604-side of the hepatorenal interface 606.

In some examples, a parameter may be extracted from sub-lengths 638, 640 for each sub-band (not shown in FIG. 6, see FIG. 5). That is, not all of the pixels included in an entire sub-band may be used to extract the parameter, rather only those pixels included in the sub-length may be used. In some examples, two parameter values may be extracted for each sub-band. For example, a value of a parameter may be extracted for sub-length 638 of a sub-band and another value of the parameter may be extracted for sub-length 640 of the sub-band. In some examples where parameters of adjacent sub-bands are compared, the values of the parameters for sub-length 638 may be compared to one another and the values of parameters for sub-length 640 may be compared to one another.

In some examples, a width of the second sub-length 640 may be based, at least in part, on a width of the renal cortex 642 of the kidney 604. In some examples, the widths of the first and second sub-lengths 638, 640 may be based, at least in part, on a width of the sub-bands such that enough pixels are within each sub-length of each sub-band to extract a parameter from each sub-length of each sub-band. For example, a portion of an image within a sub-length of a sub-band may be approximately 1 cm-1.5 cm by 1 cm-1.5 cm.

Figure 7:
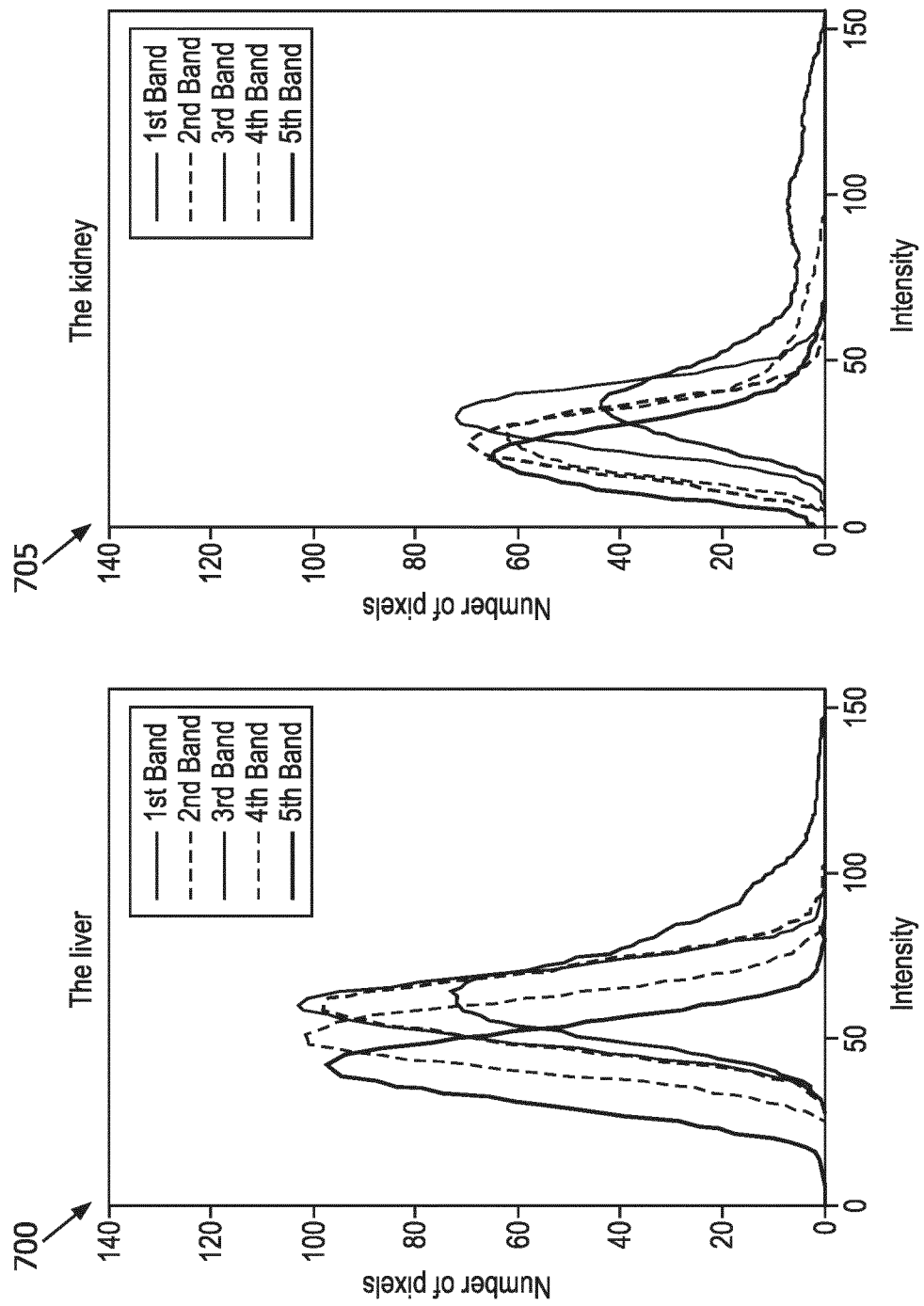
FIG. 7 shows example plots of values of a parameter extracted from an image according to principles of the present disclosure.

FIG. 7 shows example plots of values of a parameter extracted from an image according to principles of the present disclosure. Plots 700 and 705 show distributions of intensities of pixels of different sub-bands of an image, such as image 500 and/or image 600. In plot 700, each curve is the intensity distribution of pixels for a different sub-band (e.g., sub-bands 530) of a sub-width associated with the liver (e.g., sub-width 638). In plot 705, each curve is the intensity distribution of pixels for a different sub-band (e.g., sub-bands 530) of a sub-width associated with the kidney (e.g., sub-width 640). The fifth band is the sub-band closest to the bottom of the kidney (e.g., adjacent to line for lower boundary 528) and the first sub-band is the sub-band closest to the top of the kidney (e.g., adjacent to line for upper boundary 526).

In both plot 700 and 705, the curves for each sub-bands is near-Gaussian, and there is a gradual shift in the peaks due to attenuation as depth increases. However, there is not a significant change in width of the distribution or shift in the peak between adjacent sub-bands. Thus, the extracted parameters of each sub-band suggest the image is of suitable quality for acquiring HRI measurements. In some examples, a cross-correlation coefficient (CCC) may be calculated for two adjacent curves. The CCC may be compared to a threshold value to determine if the adjacent sub-bands are sufficiently similar. For example, the maximal value of the CCC may be one (1) and the sub-bands may be found sufficiently similar if the CCC is greater than or equal to 0.70.

If one or more of the curves had been non-Gaussian, a low CCC, and/or a significant shift occurred between peaks of adjacent sub-bands, it suggests that the image may not be of suitable quality for HRI measurements. For example, a significant shift in the peak intensity may suggest the presence of a blood vessel or cyst in a sub-band. In another example, a non-Gaussian distribution may suggest an image artifact that may affect the HRI measurements.

While the example shown in FIG. 7 shows intensity distributions of pixels, other parameters may be extracted from the sub-bands and/or sub-widths of the sub-bands in other examples. For example, the SNR, and/or average pixel intensity may be computed. In some examples, rather than comparing the parameters of the sub-bands to one another, an average of the extracted parameters may be calculated to determine if the image is of suitable quality. In some examples, a weighted average may be used. In some examples, the sub-band closest to the bottom of the kidney and the sub-band closest to the top of the kidney may be ignored and/or given less weight as these bands are less likely to be used for acquiring HRI measurements. If, based on the extracted parameters, it is determined the image is not of suitable quality, the ultrasound imaging system may prompt the user to acquire a new image.

In some examples, the parameters extracted from the sub-bands may be used to evaluate each sub-band individually for suitability for acquiring HRI measurements. For example, if the SNR of a particular sub-band does not meet a threshold value, the ultrasound imaging system may provide an indication to the user that the particular sub-band should not be used to select a ROI for HRI measurements rather than requiring the user to acquire a new image.

If the image is found to be of suitable quality for acquiring HRI measurements, the ultrasound imaging system may provide guidance, such as visual cues, to the user for selecting appropriate ROIs for calculating the HRI.

Returning to FIG. 5, in some examples, a display, such as display 138, may provide graphic overlays corresponding to curve 510, lines 526, 528, and/or lines demarcating sub-bands 530. Optionally, the display may provide graphic overlays corresponding to the sub-widths 638 and 630. In some examples, the display information for the graphic overlays may be provided by one or more processors, such as graphic processor 140 and/or image processor 136. By providing the sub-bands 530 on the display, the user may be guided to properly select ROIs at a same depth. By providing the curve 510, the user may be guided to properly select one ROI on the liver 502, such as example liver ROI 532, and one ROI on the kidney 504, such as example ROI 534. By providing the sub-width 640, the user may be guided to properly place ROI 534 on the renal cortex rather than another portion of the kidney 504. By providing sub-width 638, the user may be guided to select a portion of the liver 502 near the kidney 504.

As noted with reference to FIG. 7, optionally, in some examples, the display may provide graphical overlays (not shown) that indicate certain sub-bands should not be used for placing ROIs 532, 534. Examples include, but are not limited to, hash marks, "greying out" the sub-band, and/or text "DO NOT USE" over the sub-band.

Optionally, in some examples, text and/or other guidance may be provided to the user on the display. For example, a text warning may appear if the user places the ROIs 532, 534 in different sub-bands and/or outside the sub-widths. In another example, one or both of the ROIs 532, 534 may change color when one is placed in a different sub-band and/or outside a sub-width. In other examples, the system may not permit the user to place the ROIs in different sub-bands and/or outside the appropriate sub-widths. In some examples, the user may select whether sub-bands, sub-widths, and/or other visual cues for selecting the ROIs are provided on the display by providing inputs via a user interface, such as user interface 124.

Figure 8:
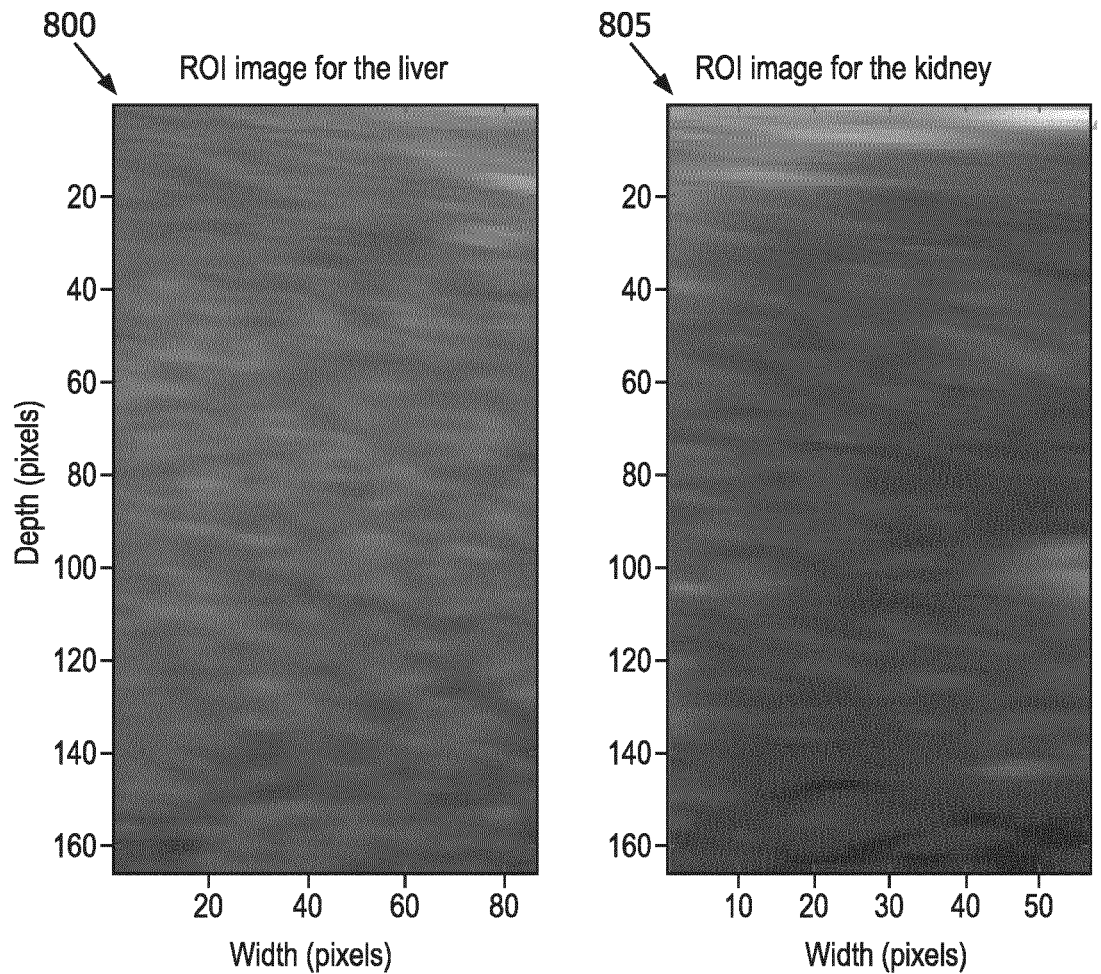
FIG. 8 shows example regions of interest according to principles of the present disclosure.

FIG. 8 shows example regions of interest according to principles of the present disclosure. Image 800 is a ROI of a liver, which may have been acquired from an image, such as image 500 and/or image 600. Image 805 is a ROI of a kidney, which may have been acquired from an image, such as image 500 and/or image 600. In some examples, image 800 may correspond to ROI 532 and image 805 may correspond to ROI 534. The HRI measurement may be calculated based, at least in part, on image 800 and image 805. Typically the HRI is determined by calculating an average intensity of image 800 and calculating an average intensity of image 805. The average intensity of image 800 is divided by the average intensity of image 805 to arrive at the HRI.

Thus, as disclosed herein, at a first stage, a user may be guided to acquire an image at a suitable imaging plane. For example, by providing guidance related to the angle of the hepatorenal interface and/or a location of the hepatorenal interface within a centrally located bounding box. Optionally, additional guidance may be provided based on the average intensity of pixels of the hepatorenal interface. At a second stage, the image acquired at a suitable imaging plane during the first stage may be assess for quality. In some examples, a portion of the image may be sub-divided into sub-bands, and the assessment may be based on an analysis of at least some of the pixels of individual sub-bands. If the quality is not suitable, the imaging system may return to the first stage. However, once the quality of the image is determined to be suitable, the sub-bands and/or other visual guidance (e.g., sub-widths) may be provided to assist the user to properly place the ROIs on the image. Once the ROIs are placed, the HRI may be calculated.

Figure 9A:
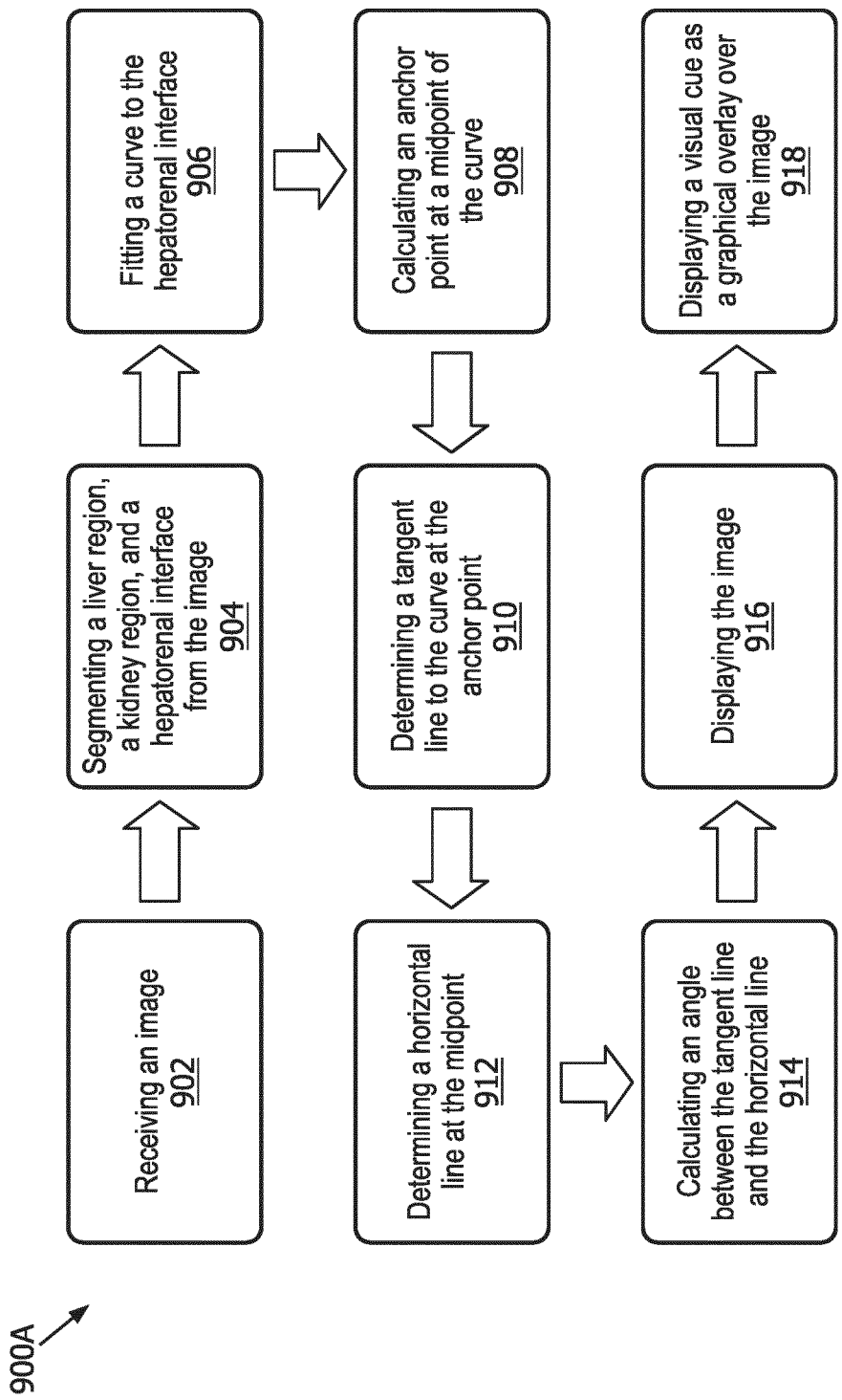
FIG. 9A is a flow chart of a method in accordance with principles of the present disclosure.

FIG. 9A is a flow chart of a method according to principles of the present disclosure. The flow chart 900A provides a technique for providing guidance to a user for acquiring an image at an imaging plane suitable for acquiring HRI measurements. In some examples, the method shown in FIG. 9A may be performed by an ultrasound imaging system, such as ultrasound imaging system 100. For example, one or more processors of ultrasound imaging system 100, such as image processor 136 and graphic processor 140, may execute one or more instructions to perform some or all of the method shown in FIG. 9A. In some examples, the instructions may be stored on a non-transitory computer readable medium, such as local memory 142.

As indicated at block 902, one or more processors may receive an image. The one or more processors may segment the image do extract a liver region, a kidney region, and a hepatorenal interface as indicated at block 904. The one or more processors may fit a curve to the hepatorenal interface as indicated by block 906. Once the curve is fitted, a midpoint of the curve may be calculated to find a location of an anchor point as indicated by block 908. Based, at least in part, on the curve and the anchor point, the one or more processors may determine a tangent line to the curve at the anchor point as indicated by block 910. A horizontal line at the anchor point may also be determined by the one or more processors as indicated by block 912.

As indicated by block 914, the one or more processors may calculate an angle between the tangent line and the horizontal line. In some examples, the suitability of the image may be based, at least in part, on a comparison of the angle to a threshold value (e.g., 30 degrees).

As indicated by block 916, the currently acquired image may be displayed (e.g., on display 138). A visual cue may also be displayed as a graphical overlay on the image as indicated by block 918. In some examples, the visual cue is based, at least in part the tangent line and the angle between the tangent line and the horizontal line. In some examples, the visual cue may include the anchor point, the tangent line, and/or the horizontal line. In some examples, an indicator of the angle may also be displayed, such as indicator 424. In some examples, a bounding box, such as bounding box 418, may be displayed in a central portion of the image may be displayed. This may assist the user in acquiring the image at a suitable imaging plane for acquiring HRI measurements. Of course, it is understood that the operations performed at blocks 902-918 may be performed continuously and/or repeatedly as the user moves the ultrasound probe and new images are acquired by the ultrasound imaging system.

Figure 9B:
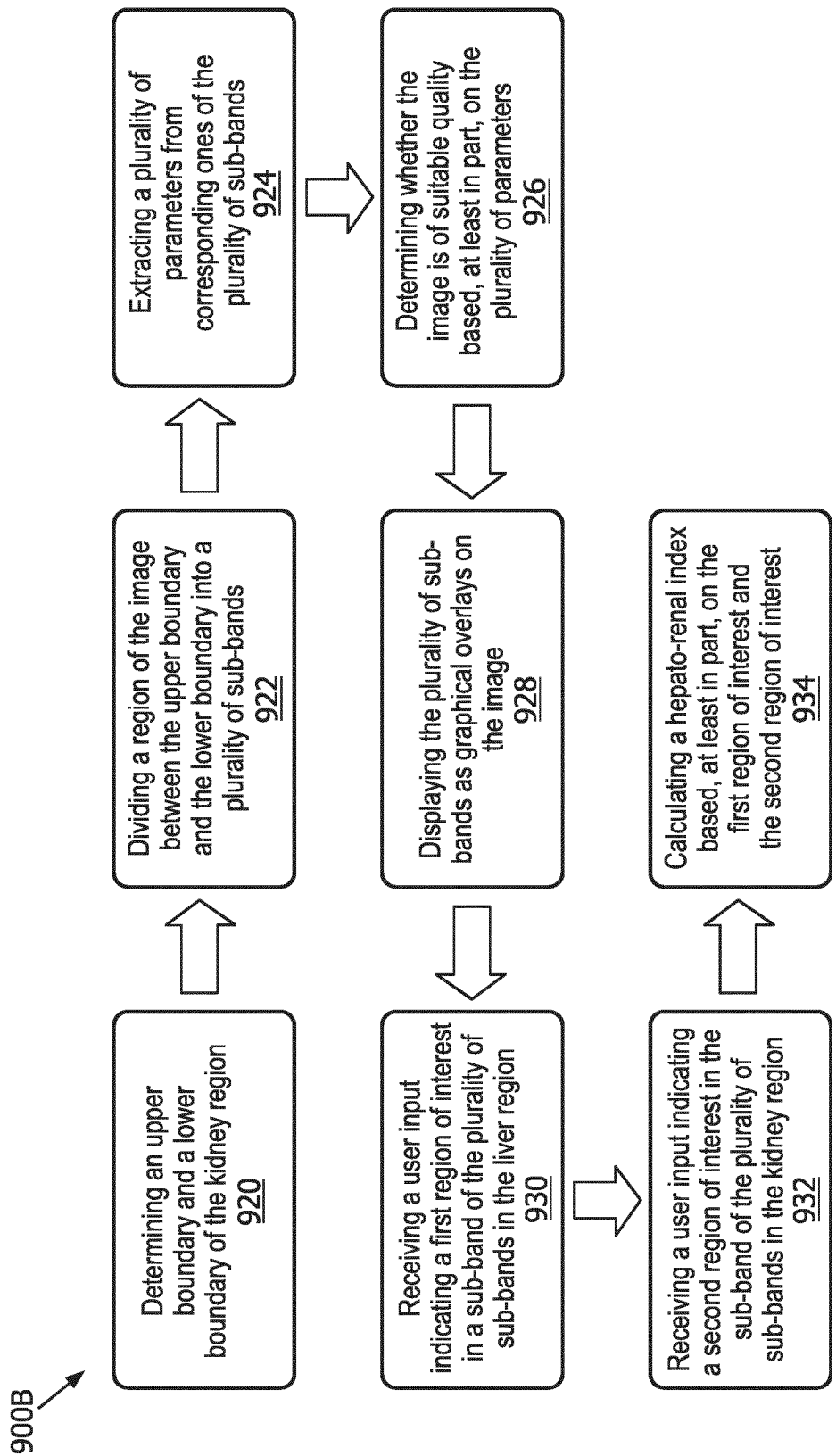
FIG. 9B is a flow chart of a method in accordance with principles of the present disclosure.

FIG. 9B is a flow chart of a method according to principles of the present disclosure. The method shown in flow chart 900B may provide a technique for guiding a user in selecting appropriate ROIs as well as determining suitability of the image for HRI measurements. In some examples, the method shown in FIG. 9B may be performed by an ultrasound imaging system, such as ultrasound imaging system 100. For example, one or more processors of ultrasound imaging system 100, such as image processor 136 and graphic processor 140, may execute one or more instructions to perform some or all of the method shown in FIG. 9A. In some examples, the instructions may be stored on a non-transitory computer readable medium, such as local memory 142. In some examples, the method shown in FIG. 9B may be performed after the method shown in FIG. 9A is performed.

As indicated by block 920, one or more processors may determine upper and lower boundaries of the kidney region in an image. The one or more processors may divide the region between the boundaries into multiple sub-bands as indicated by block 922. In some examples, the one or processors may extract a parameter from at least some of the pixels of each of the sub-bands, or at least some of the sub-bands, as indicated by block 924. In some examples the one or more processors may further divide the sub-bands into sub-widths, such as sub-widths 638 and 640 and parameters may be extracted from the sub-widths of the sub-bands. The one or more processors may determine whether the image is of suitable quality based, at least in part, on the parameters as indicated by block 926. In some examples, the image is determined to be of suitable quality based, at least in part, on a comparison of parameters of adjacent sub-bands to one another. In some examples, the image is determined to be of suitable quality based, at least in part, on a comparison of one or more of the parameters to one or more threshold values.

The sub-bands and/or sub-widths may be displayed as graphical overlays on the image as indicated by block 928. The sub-bands and/or sub-widths provided on the display may guide the user to place ROIs in appropriate regions of the liver and kidney. The graphical overlays may further guide the user to place the ROIs at the same depth. The one or more processors may receive a user input (e.g., via a user interface, such as user interface 124) indicating ROIs as indicated by blocks 930 and 932. Based, at least in part, by pixels located in the ROIs, the one or more processors may calculate the HRI as indicated by block 934. In some examples, the HRI may be provided as text on the display with the image.

Figure 10:
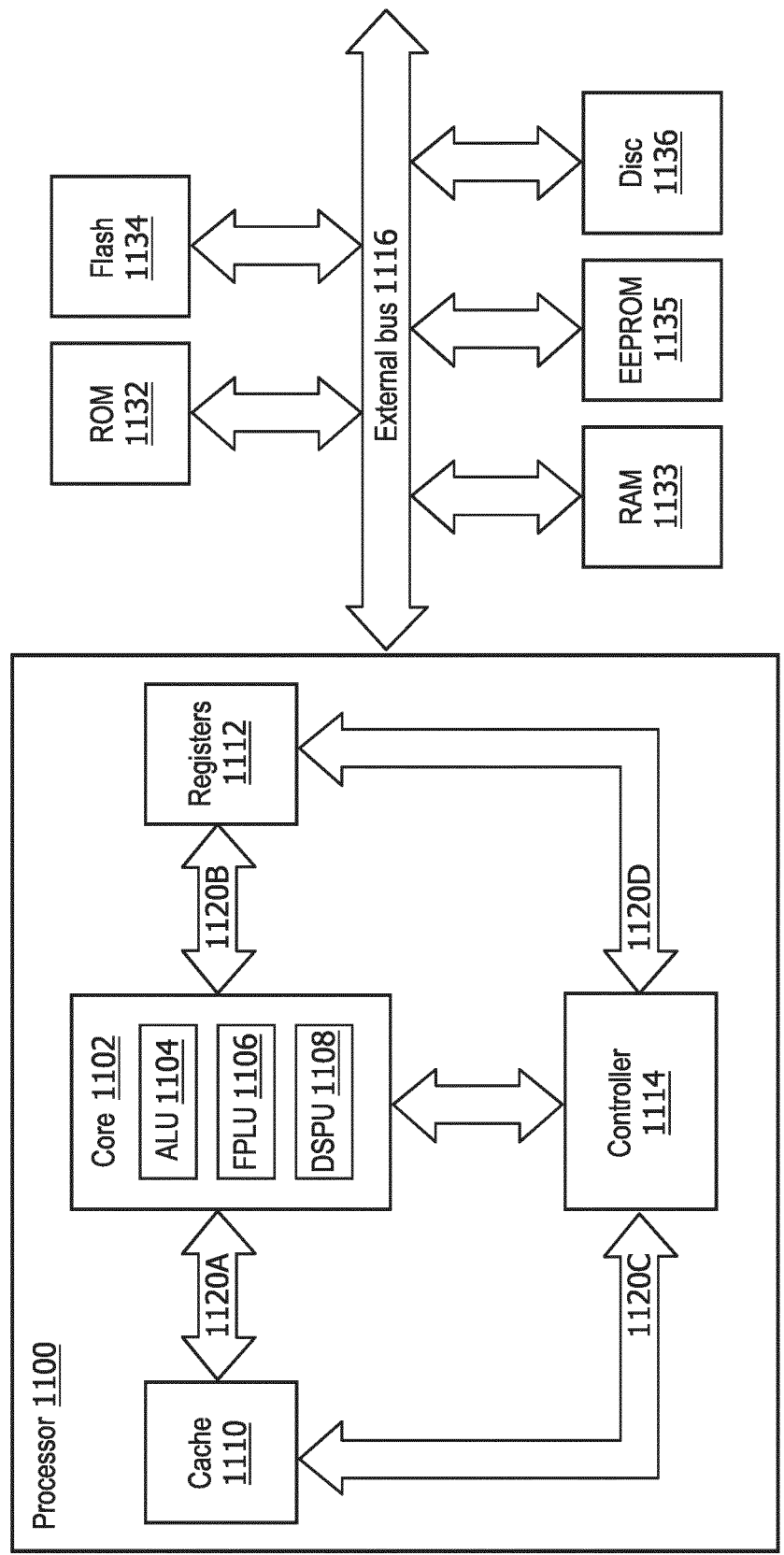
FIG. 10 is a block diagram illustrating an example processor according to principles of the present disclosure.

FIG. 10 is a block diagram illustrating an example processor 1000 according to principles of the present disclosure. Processor 1000 may be used to implement one or more processors and/or controllers described herein, for example, image processor 136 shown in FIG. 1 and/or any other processor or controller shown in FIG. 1. Processor 1000 may be any suitable processor type including, but not limited to, a microprocessor, a microcontroller, a digital signal processor (DSP), a field programmable array (FPGA) where the FPGA has been programmed to form a processor, a graphical processing unit (GPU), an application specific circuit (ASIC) where the ASIC has been designed to form a processor, or a combination thereof.

The processor 1000 may include one or more cores 1002. The core 1002 may include one or more arithmetic logic units (ALU) 1004. In some embodiments, the core 1002 may include a floating point logic unit (FPLU) 1006 and/or a digital signal processing unit (DSPU) 1008 in addition to or instead of the ALU 1004.

The processor 1000 may include one or more registers 1012 communicatively coupled to the core 1002. The registers 1012 may be implemented using dedicated logic gate circuits (e.g., flip-flops) and/or any memory technology. In some embodiments the registers 1012 may be implemented using static memory. The register may provide data, instructions and addresses to the core 1002.

In some embodiments, processor 1000 may include one or more levels of cache memory 1010 communicatively coupled to the core 1002. The cache memory 1010 may provide computer-readable instructions to the core 1002 for execution. The cache memory 1010 may provide data for processing by the core 1002. In some embodiments, the computer-readable instructions may have been provided to the cache memory 1010 by a local memory, for example, local memory attached to the external bus 1116. The cache memory 1010 may be implemented with any suitable cache memory type, for example, metal-oxide semiconductor (MOS) memory such as static random access memory (SRAM), dynamic random access memory (DRAM), and/or any other suitable memory technology.

The processor 1000 may include a controller 1014, which may control input to the processor 1000 from other processors and/or components included in a system (e.g., control panel 152 and scan converter 130 shown in FIG. 1) and/or outputs from the processor 1000 to other processors and/or components included in the system (e.g., display 138 and volume renderer 134 shown in FIG. 1). Controller 1014 may control the data paths in the ALU 1004, FPLU 1006 and/or DSPU 1008. Controller 1014 may be implemented as one or more state machines, data paths and/or dedicated control logic. The gates of controller 1014 may be implemented as standalone gates, FPGA, ASIC or any other suitable technology.

The registers 1012 and the cache memory 1010 may communicate with controller 1014 and core 1102 via internal connections 1020A, 1020B, 1020C and 1020D. Internal connections may implemented as a bus, multiplexor, crossbar switch, and/or any other suitable connection technology.

Inputs and outputs for the processor 1000 may be provided via a bus 1016, which may include one or more conductive lines. The bus 1016 may be communicatively coupled to one or more components of processor 1000, for example the controller 1014, cache memory 1010, and/or register 1012. The bus 1016 may be coupled to one or more components of the system, such as display 138 and control panel 152 mentioned previously.

The bus 1016 may be coupled to one or more external memories. The external memories may include Read Only Memory (ROM) 1032. ROM 1032 may be a masked ROM, Electronically Programmable Read Only Memory (EPROM) or any other suitable technology. The external memory may include Random Access Memory (RAM) 1033. RAM 1033 may be a static RAM, battery backed up static RAM, Dynamic RAM (DRAM) or any other suitable technology. The external memory may include Electrically Erasable Programmable Read Only Memory (EEPROM) 1035. The external memory may include Flash memory 1034. The external memory may include a magnetic storage device such as disc 1036. In some embodiments, the external memories may be included in a system, such as ultrasound imaging system 100 shown in FIG. 1, for example local memory 142.

The systems, methods, and apparatuses disclosed herein may provide scanning or imaging plane identification technique and/or ultrasound image quality control technique that can be utilized in general liver imaging where HRI measurements are desired which may reduce workload for busy ultrasound users in some examples. In some examples, the systems, methods, and apparatuses may be implemented on an ultrasound imaging system that provides a raw data/RF signal and/or DICOM images. In some examples, the systems, methods, and apparatuses may be included as a component of computer-aided diagnosis (CAD) system to assist doctors in liver ultrasound study determine key parameter measurements and reporting.

Although described with reference to live imaging, the techniques described herein may be applied to previously acquired images, such as DICOM images stored in a picture archiving and communication system (PACS). For example, pre-acquired images may be segmented and analyzed as described with reference to FIGS. 2-4, and if the angle is found suitable, the pre-acquired image may be analyzed as described with reference to FIGS. 5-7. If the pre-acquired image is suitable for acquiring HRI measurements, the user may be guided to properly select ROIs and the HRI measurement may be computed as described with reference to FIGS. 5 and 8.

In various embodiments where components, systems and/or methods are implemented using a programmable device, such as a computer-based system or programmable logic, it should be appreciated that the above-described systems and methods can be implemented using any of various known or later developed programming languages, such as "C", "C++", "C#", "Java", "Python", and the like. Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform functions of the systems and/or methods described herein. For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

In view of this disclosure it is noted that the various methods and devices described herein can be implemented in hardware, software and firmware. Further, the various methods and parameters are included by way of example only and not in any limiting sense. In view of this disclosure, those of ordinary skill in the art can implement the present teachings in determining their own techniques and needed equipment to affect these techniques, while remaining within the scope of the invention. The functionality of one or more of the processors described herein may be incorporated into a fewer number or a single processing unit (e.g., a CPU) and may be implemented using application specific integrated circuits (ASICs) or general purpose processing circuits which are programmed responsive to executable instruction to perform the functions described herein. Further, the present system may also include one or more programs which may be used with conventional imaging systems so that they may provide features and advantages of the present system. Certain additional advantages and features of this disclosure may be apparent to those skilled in the art upon studying the disclosure, or may be experienced by persons employing the novel system and method of the present disclosure. Another advantage of the present systems and method may be that conventional medical image systems can be easily upgraded to incorporate the features and advantages of the present systems, devices, and methods.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An ultrasound imaging system configured to provide user guidance for acquiring images suitable for hepato-renal index measurements, the system comprising:
    an ultrasound probe configured to transmit and receive ultrasound signals;
    a non-transitory computer readable medium encoded with instructions; and at least one processor in communication with the non-transitory computer readable medium and configured to execute the instructions, wherein when executed, the instructions cause the at least one processor to:
    segment a liver region, a kidney region, and a hepatorenal interface from an ultrasound image acquired by the ultrasound probe;
    fit a curve to the hepatorenal interface;
    calculate an anchor point at a midpoint of the curve;
    determine a tangent line to the curve at the anchor point;
    determine a horizontal line at the midpoint;
    calculate an angle between the tangent line and the horizontal line;
    generate a visual cue for display, wherein the visual cue is based on the tangent line and the angle between the tangent line and the horizontal line;
    provide user guidance based on the visual cue to move the ultrasound probe and acquire a new ultrasound image suitable for obtaining hepato-renal index measurements; and
    a display configured to display the acquired ultrasound image and the visual cue as a graphical overlay over the acquired ultrasound image.

2. The ultrasound imaging system of claim 1, wherein the instructions further cause the at least one processor to calculate an average intensity of a plurality of pixels of the hepatorenal interface.

3. The ultrasound imaging system of claim 1, wherein the visual cue further comprises an indicator that indicates the angle, and the display is configured to display the indicator.

4. The ultrasound imaging system of claim 3, wherein the indicator provides a qualitative indicator of the angle, wherein the qualitative indicator is based on a comparison of the angle to a threshold value.

5. The ultrasound imaging system of claim 1, wherein the instructions further cause the at least one processor to:
    determine an upper boundary and a lower boundary of the kidney region;
    divide a region of the image between the upper boundary and the lower boundary into a plurality of sub-bands;
    extract a plurality of parameters from each respective sub-band of the plurality of sub-bands; and
    determine whether the ultrasound image is of suitable quality based on the plurality of parameters.

6. The ultrasound imaging system of claim 5, wherein individual ones of the plurality of parameters are extracted from a portion of pixels of the corresponding ones of the plurality of sub-bands.

7. The ultrasound imaging system of claim 5, wherein the ultrasound image is determined to be of suitable quality based on a comparison of the plurality of imaging parameters to a threshold value.

8. The ultrasound imaging system of claim 5, wherein the ultrasound image is determined to be of suitable quality based on a comparison of a parameter of the plurality of parameters of a sub-band of the plurality of sub-bands to another parameter of the plurality of parameters of an adjacent sub-band of the plurality of sub-bands.

9. The ultrasound imaging system of claim 5, wherein the instructions further cause the at least one processor to divide individual ones of the plurality of sub-bands into at least two sub-widths, wherein a first sub-width includes at least a portion of the liver region and a second sub-width includes at least a portion of the kidney region.

10. The ultrasound imaging system of claim 1, wherein the instructions further cause the at least one processor to:
    determine an upper boundary and a lower boundary of the kidney region;
    divide a region of the image between the upper boundary and the lower boundary into a plurality of sub-bands; and
    generate display information for the plurality of sub-bands; and
    wherein the display is further configured to display the plurality of sub-bands.

11. The ultrasound imaging system of claim 10, further comprising a user interface configured to receive a user input comprising an indication of a first region of interest in the liver region and a second region of interest in the kidney region.

12. A method for providing user guidance for acquiring ultrasound images suitable for hepato-renal index measurements, the method comprising:
    receiving an ultrasound image acquired by an ultrasound probe;
    segmenting a liver region, a kidney region, and a hepatorenal interface from the ultrasound image;
    fitting a curve to the hepatorenal interface;
    calculating an anchor point at a midpoint of the curve;
    determining a tangent line to the curve at the anchor point;
    determining a horizontal line at the midpoint;
    calculating an angle between the tangent line and the horizontal line;
    generate a visual cue, wherein the visual cue is based on the tangent line and the angle between the tangent line and the horizontal line;

provide user guidance based on the visual cue to move the ultrasound probe and acquire a new ultrasound image suitable for obtaining hepato-renal index measurements;

displaying the acquired ultrasound image; and displaying a visual cue as a graphical overlay over the acquired ultrasound image wherein the visual cue is based on the tangent line and the angle between the tangent line and the horizontal line, and wherein the visual cue is for providing the user guidance for acquiring images suitable for obtaining the hepato-renal index measurements.

13. The method of claim 12, wherein the visual cue further includes an indicator of the angle.

14. The method of claim 12, wherein the visual cue includes at least one of the tangent line or the horizontal line, and the method further comprising changing a color of at least one of the tangent line or the horizontal line based on a comparison of the angle to a threshold value.

15. The method of claim 12, further comprising displaying a bounding box as a graphical overlay at a central portion of the acquired ultrasound image.

16. The method of claim 12, further comprising:
determining an upper boundary and a lower boundary of the kidney region; and
dividing a region of the image between the upper boundary and the lower boundary into a plurality of sub-bands.

17. The method of claim 16, further comprising:
extracting a plurality of parameters from corresponding ones of the plurality of sub-bands; and
determining whether the ultrasound image is of suitable quality based on the plurality of parameters.

18. The method of claim 17, wherein the ultrasound image is determined to be of suitable quality based on a comparison of a parameter of the plurality of parameters of a sub-band of the plurality of sub-bands to another parameter of the plurality of parameters of an adjacent sub-band of the plurality of sub-bands.

19. The method of claim 16, further comprising displaying the plurality of sub-bands as graphical overlays on the acquired ultrasound image.

20. The method of claim 19, further comprising:
receiving a first user input indicating a first region of interest in a sub-band of the plurality of sub-bands in the liver region;
receiving a second user input indicating a second region of interest in the sub-band of the plurality of sub-bands in the kidney region; and
calculating a hepato-renal index based, at least in part, on the first region of interest and the second region of interest.

* * * * *